UNITED STATES PATENT OFFICE.

FRANK J. BAUMGARDNER, OF CLEVELAND, OHIO, ASSIGNOR OF ONE-FOURTH TO FRANK L. PHIPPS AND ONE-FOURTH TO CHARLES R. GIBSON, BOTH OF CLEVELAND, OHIO.

PRINTING-INK AND PROCESS OF MAKING SAME.

1,259,713. Specification of Letters Patent. Patented Mar. 19, 1918.

No Drawing. Application filed January 25, 1917. Serial No. 144,382.

*To all whom it may concern:*

Be it known that I, FRANK J. BAUMGARDNER, a citizen of the United States, residing at Cleveland, in the county of Cuyahoga and State of Ohio, have invented certain new and useful Improvements in Printing-Inks and Processes of Making Same, of which the following is a specification.

My invention relates to an improved printing ink and process of making same, the primary object being to provide what may be termed a "non-skin forming" or non-evaporating printing ink adapted by reason of its improved composition and the process of making same to meet the varying demands of actual service.

By reason of the above the usual skin or covering which forms or collects on printing inks within a very short time after exposure to the atmosphere is prevented, and, as is well known, this skin or covering is a constant source of annoyance, waste and expense. By reason of the prevention of the formation of this skin or covering it is believed that the present form of ink will save the consumer from 10 to 50% due to this loss alone.

In attaining the above mentioned objects and carrying out the improved process I use the ingredients hereinafter referred to, entirely eliminating the use of artificial driers, such for example,—as the various commonly employed liquid driers, lead driers, manganese, linoleate, and the like. Furthermore, I use no linseed oil, resins, or varnishes.

In order to prevent the volatilization and evaporation of various valuable and necessary ingredients having certain desired properties and which would naturally result by the application of heat in the process, the ingredients are dissolved and compounded in what may be termed "a cold process," as hereinafter referred to, and by reason of the improved process and the product resulting therefrom, the life of the composition rollers commonly employed on printing presses is preserved or extended as the mineral oil and ingredients used in this process are neutral to the glycerin and other substances of the composition rollers.

In carrying out the improved method or process of making the improved printing ink I take approximately .47 mineral oil, .53 of asphaltum, preferably what is commonly known as "Assyrian asphaltum," adding thereto the desired coloring matter as required,—such for example,—as an oil anilin, a pigment base ground in mineral oil, or a carbon black ground in mineral oil, and dissolving by a thorough agitation and commingling by a cold process,—or in other words,—without the application of heat.

As is well known to those skilled in the art to which this invention relates, it is now necessary to use printing inks of varying character to meet the varying demands of the different stocks of paper, for example,— on a bond stock a heavy ink is required, on a coated stock, a soft ink, etc., and on various other stocks differently bodied inks must necessarily be used, and, furthermore, inks with different or varying bodies must be used in accordance with the different seasons of the year, while with my improved ink the same is of a character for universal application and is not affected by varying temperatures or climates so that an ink of a fixed or standard character is applicable for universal use.

Having thus described some of the embodiments of my invention, what I claim and desire to secure by Letters Patent is,—

1. A non-evaporating printing ink, consisting solely of mineral oil, asphaltum, and a pigment.

2. A non-skin forming printing ink, comprising a cold dissolved mineral oil, asphaltum, and pigment base.

3. A non-evaporating printing ink, comprising mineral oil, asphaltum, and a pigment base cold dissolved and free from drying agents.

4. A non-evaporating printing ink, comprising mineral oil, asphaltum, and anilin dissolved and commingled without the application of heat.

5. A non-evaporating printing ink, comprising mineral oil, asphaltum, and a pigment base commingled and dissolved substantially as described and in about the proportions stated.

6. A non-skin forming printing ink, comprising a mineral oil, Assyrian asphaltum, and a pigment base cold dissolved and commingled in substantially the proportions stated.

7. The process of making non-evaporating printing ink, consisting in cold dissolving a mineral oil, asphaltum, and a pigment base.

8. The process of making printing ink, consisting in (1) dissolving a mineral oil and Assyrian asphaltum, and (2) adding a pigment base ground in mineral oil without the application of heat.

9. The process of making non-evaporating printing ink, consisting in cold dissolving by agitation mineral oil, asphaltum, and coloring matter in substantially the proportions stated.

10. The process of making non-evaporating printing ink, consisting in cold dissolving by agitation in a mineral oil, asphaltum, and a coloring agent in substantially the manner and proportions stated.

11. The process of making non-skin forming ink, consisting in thoroughly dissolving and commingling without vaporization or heating agents mineral oil, asphaltum and a coloring agent.

In testimony whereof I have affixed my signature in the presence of two witnesses.

FRANK J. BAUMGARDNER.

Witnesses:
CHAS. R. GIBSON,
F. L. PHIPPS.